(12) United States Patent
Chevalier

(10) Patent No.: US 6,767,022 B1
(45) Date of Patent: Jul. 27, 2004

(54) METHODS AND APPARATUS FOR STEERING AN ATV

(75) Inventor: Mark Chevalier, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 76 days.

(21) Appl. No.: 10/099,202

(22) Filed: Mar. 13, 2002

Related U.S. Application Data (60) Provisional application No. 60/313,599, filed on Aug. 20, 2001, and provisional application No. 60/313,417, filed on Aug. 17, 2001.

(51) Int. Cl.⁷ .......................... B60G 3/20; B60G 15/07; B62D 7/16

(52) U.S. Cl. .................. 280/124.136; 280/124.146; 280/93.507; 280/93.51

(58) Field of Search .................... 280/93.51, 93.511, 280/93.507, 93.502, 124.136, 124.138, 124.146

(56) References Cited

U.S. PATENT DOCUMENTS

| | | | |
|---|---|---|---|
| 3,827,516 A | | 8/1974 | Lucia |
| 3,884,314 A | | 5/1975 | Callaway |
| 3,912,030 A | | 10/1975 | Payne |
| 3,942,816 A | * | 3/1976 | Scherenberg et al. . 280/124.138 |
| 4,448,441 A | * | 5/1984 | Brummer et al. ..... 280/124.146 |
| 4,610,461 A | | 9/1986 | Guzzetta |
| 4,620,715 A | | 11/1986 | Takahashi |
| 4,625,982 A | | 12/1986 | Matsuo |
| 4,650,029 A | | 3/1987 | Foote et al. |
| 4,657,271 A | | 4/1987 | Salmon |
| 4,671,521 A | | 6/1987 | Talbot et al. |
| 4,699,234 A | | 10/1987 | Shinozaki et al. |
| 4,749,205 A | | 6/1988 | Takahashi et al. |
| 4,822,073 A | * | 4/1989 | Tanahashi et al. ....... 280/93.51 |
| 5,000,476 A | | 3/1991 | Lindorfer et al. |
| 5,029,664 A | | 7/1991 | Zulawski |
| 6,009,966 A | | 1/2000 | Olson et al. |
| 6,125,958 A | | 10/2000 | Olson et al. |
| 6,311,798 B1 | | 11/2001 | Anderson |
| 6,343,666 B1 | | 2/2002 | Olson et al. |
| 6,357,543 B1 | | 3/2002 | Karpik |
| 2002/0017765 A1 | | 2/2002 | Mallette et al. |

FOREIGN PATENT DOCUMENTS

JP          62218209 A    *   9/1987   ............ B60G/3/20

* cited by examiner

Primary Examiner—Peter C. English
(74) Attorney, Agent, or Firm—Allen W. Groenke; Fredrikson & Byron, P.A.

(57) ABSTRACT

Methods and apparatus related to the suspension and steering of all terrain vehicles (ATVs) are disclosed. An ATV having a frame and a wheel carrier for rotatably supporting a wheel is provided. A tie rod is coupled to the wheel carrier at an outer joint. An inner joint of the tie rod is preferably located in a desirable location. A method for identifying the desirable location may include the steps of defining a first reference plane associated with a full compression position of the suspension, defining a second reference plane associated with a full extension position of the suspension, identifying a reference line formed by an intersection of the first reference plane and the second reference plane, and selecting a location proximate the reference line as the desirable location for the inner joint.

21 Claims, 12 Drawing Sheets

METHODS AND APPARATUS FOR STEERING AN ATV

RELATED APPLICATIONS

This application is related to and claims priority to U.S. Provisional Application No. 60/313,599 by Chevalier filed Aug. 20, 2001, and entitled Suspension System for an ATV.

This application is also related to and claims priority to U.S. Provisional Application No. 60/313,417 by Chevalier filed Aug. 17, 2001, and entitled Steering System for an ATV.

The entire disclosure of the fore mentioned applications is hereby incorporated by reference.

FIELD OF THE INVENTION

The present invention relates generally to all terrain vehicles having a straddle-seat for accommodating a rider and a set of handle bars for receiving the hands of the rider. More particularly, the present invention relates to suspension and steering systems for all terrain vehicles.

BACKGROUND OF THE INVENTION

In recent years, all terrain vehicles (ATVs) have gained widespread popularity. ATVs are commonly used in hunting, trail riding and utility applications such as the wide variety of maintenance activities which take place on a farm. Attachments are available for ATVs for use in utility applications such as plowing snow, mowing grass and hauling materials.

Perhaps the most common ATV application is trail riding. Trail riding on an ATV allows an ATV enthusiast to travel through areas which are not accessible by ordinary automobiles. Modern ATVs, can cover ground very rapidly and can cover great distances. Frequently, ATV enthusiasts ride their ATV for many hours straight and cover many miles. If the rider is subjected to excessive jarring while traveling over rough terrain, operator fatigue may result particularly during a long ride. During such long rides, an ATV may be used to carry a rider through a wide variety of terrain. Terrain which may be encountered includes forests, swamps, and deserts. Frequently ATVs are called upon to travel across rugged terrain at relatively high speeds.

Part of the thrill of riding an ATV is encountering challenging terrain, and through the performance of the ATV and the skill of the rider passing through the terrain. The ability to tackle challenging terrain may depend on the performance of the steering systems, suspension, and the interface between the rider and the ATV. These elements each effect the riding experience enjoyed by the ATV enthusiast.

SUMMARY OF THE INVENTION

The present invention relates generally to all terrain vehicles having a straddle-seat for accommodating a rider and a set of handle bars for receiving the hands of the rider. More particularly, the present invention relates to suspension and steering systems for all terrain vehicles. An ATV in accordance with the present invention may include a frame and a wheel carrier for rotatably supporting a wheel.

In certain implementations, the present invention comprises a steering system including a steering column. A steering arm is fixed to the steering column proximate a proximal end thereof. In certain implementations, a pair of handle bars are fixed to the steering column proximate a distal end thereof. In one aspect of the present invention, the proximal end of the steering column is rotatably supported by a mounting bracket. In certain implementations, the mounting bracket also rotatably supports a left intermediate arm and a right intermediate arm. The left intermediate arm may be advantageously coupled to the steering arm by a left link, and the right intermediate arm may be coupled to steering arm by a right link.

The steering system may also include a left tie rod and a right tie rod. Each tie rod may be pivotally coupled to a protrusion of a wheel carrier at an outer joint of the tie rod. Each tie rod may also be pivotally coupled to an intermediate arm at an inner joint of the tie rod. The steering system may be used to rotate a wheel carrier about a steering axis of the wheel carrier. In a preferred embodiment, a suspension and steering system is provided which is dimensioned so that movement of the suspension through its travel between a full extension position and a full compression position is unlikely to cause rotation of the wheel carrier about the steering axis. In an advantageous implementation, the inner joint of each tie rod is located so that rotation of the wheel carrier about the steering axis due to deflection of the suspension will be minimized.

Methods in accordance with the present invention may be used to locate a desirable position for the inner joint of each tie rod. A method for identifying the desirable location may include the steps of defining a first reference plane associated with a full compression position of the suspension, defining a second reference plane associated with a full extension position of the suspension, and identifying a reference line formed by an intersection of the first reference plane and the second reference plane.

A position may be selected proximate the reference line as the desirable position for the inner joint. In certain implementations, the inner joint is located so that the reference line intersects the inner joint. In some cases, the inner joint may be advantageously located so that the reference line intersects a center of the inner joint. In other cases, the inner tie rod joint may be located so that the center of the inner joint is disposed within a reference cylinder centered on the reference line.

In certain implementations, the step of defining the first reference plane comprises the steps of locating an instant center axis of the suspension when the suspension is at full compression and locating of a central point of the outer joint of the tie rod when the suspension is at full compression. In these implementations, the first reference plane is defined by the instant center axis and the central point located for the suspension at full compression.

In certain implementations, the step of defining the second reference plane comprises the steps of locating an instant center axis of the suspension when the suspension is at full extension and locating of a central point of the outer joint of the tie rod when the suspension is at full extension. In these implementations, the second reference plane is defined by the instant center axis and the central point located for the suspension at full extension.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
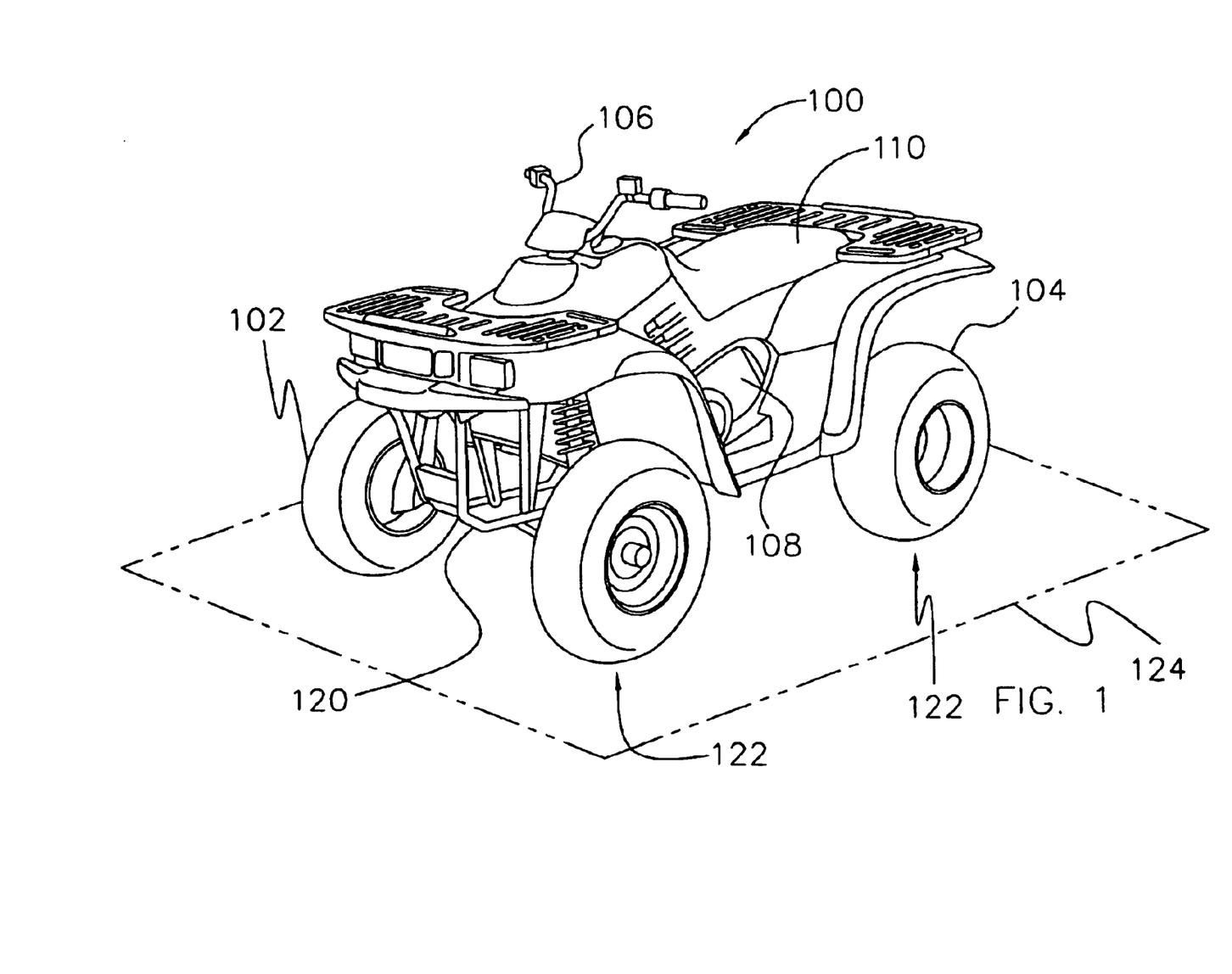
FIG. 1 is a perspective view of a ATV in accordance with the present invention.

FIG. 1 is a perspective view of an ATV 100 in accordance with the present invention. ATV 100 includes two front wheels 102 and two rear wheels 104. A set of handle bars 106 are coupled to the front wheels 102 for steering the ATV 100. An engine 108 is typically used to power the rear wheels 104, and in some cases also the front wheels 102. ATV 100 also includes a straddle-type seat 110 and foot rests for use by a rider of the ATV. In the embodiment of FIG. 1, engine 108 and seat 110 are both preferably coupled to a frame 120 of the ATV 100. Each of the front wheels 102 and rear wheels have a momentary ground contact point 122. The momentary ground contact points 122 of the wheels define a wheel contact plane 124. In the embodiment of FIG. 1, each of the front wheels 102 is coupled to frame 120 by a front suspension and each of the rear wheels 104 is coupled to frame 120 by a rear suspension.

Figure 2:
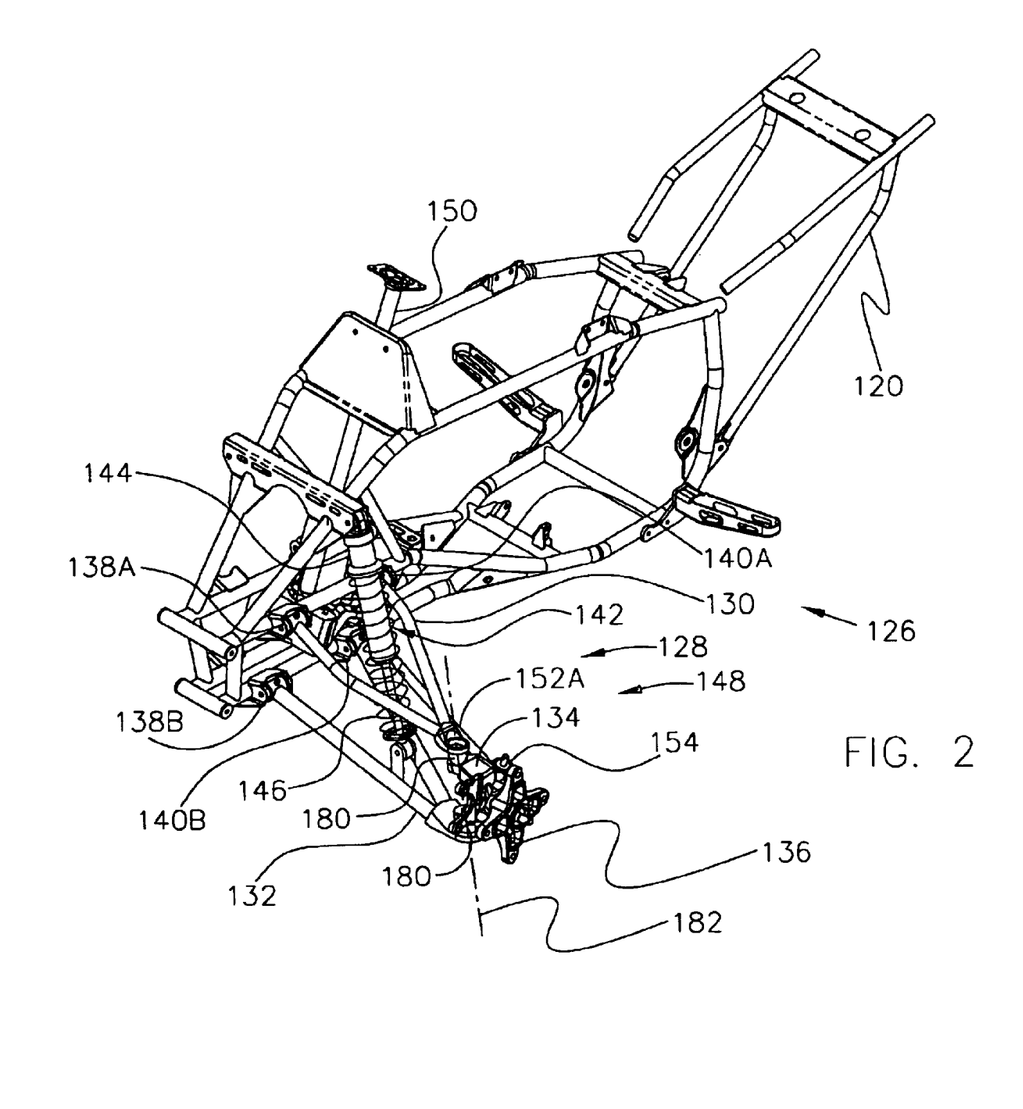
FIG. 2 is a perspective view of an assembly in accordance with an additional exemplary embodiment of the present invention.

FIG. 2 is a perspective view of an assembly 126 in accordance with an exemplary embodiment of the present invention. Assembly 126 includes a frame 120, and a suspension 128 comprising an upper arm 130, and a lower arm 132. In the embodiment of FIG. 2, upper arm 130 is rotatably coupled to frame 120 at a first joint 138A and a second joint 140A. Also in the embodiment of FIG. 2, lower arm 132 is rotatably coupled to frame 120 at a first joint 138B and a second joint 140B.

Suspension 128 also includes a wheel carrier 134 that is coupled to upper arm 130 and lower arm 132. In the exemplary embodiment of FIG. 2, an outer end of upper aim 130 is coupled to an upper portion of wheel carrier 134. Also in the exemplary embodiment of FIG. 2, an outer end of lower arm 132 is coupled to a lower portion of wheel carrier 134. A hub 136 is preferably rotatably coupled to wheel carrier 134.

In the embodiment of FIG. 2, upper arm 130 and lower arm 132 are coupled to wheel carrier 134 by ball joints 180. Ball joints 180 preferably provide three rotational degrees of freedom. The rotational degrees of freedom provided by ball joints 180 allow suspension 128 to move between a full compression position and a full extension provision and at the same time allow wheel carrier 134 to rotate about a steering axis 182. In the embodiment of FIG. 2, suspension 128 is shown in an intermediate position lying between the full extension position and the fill compression position.

Assembly 126 also comprises a steering system 148 that is configured to rotate wheel carrier 134 about steering axis 182. Steering system 148 includes a steering column 150 and a left tie rod 152A. An outer end of left tie rod 152A is pivotally coupled to a protrusion 154 of wheel carrier 134. Steering column 150 is preferably rotatably supported by frame 120. A pair of handle bars may be fixed to steering column 150 proximate a distal end thereof.

Suspension 128 also includes a spring assembly 142 having a first end rotatably coupled to frame 120 and a second end rotatably coupled to lower arm 132. In the embodiment of FIG. 2, spring assembly 142 includes a shock absorber 144 and a spring 146 that is disposed about shock absorber 144.

Figure 3:
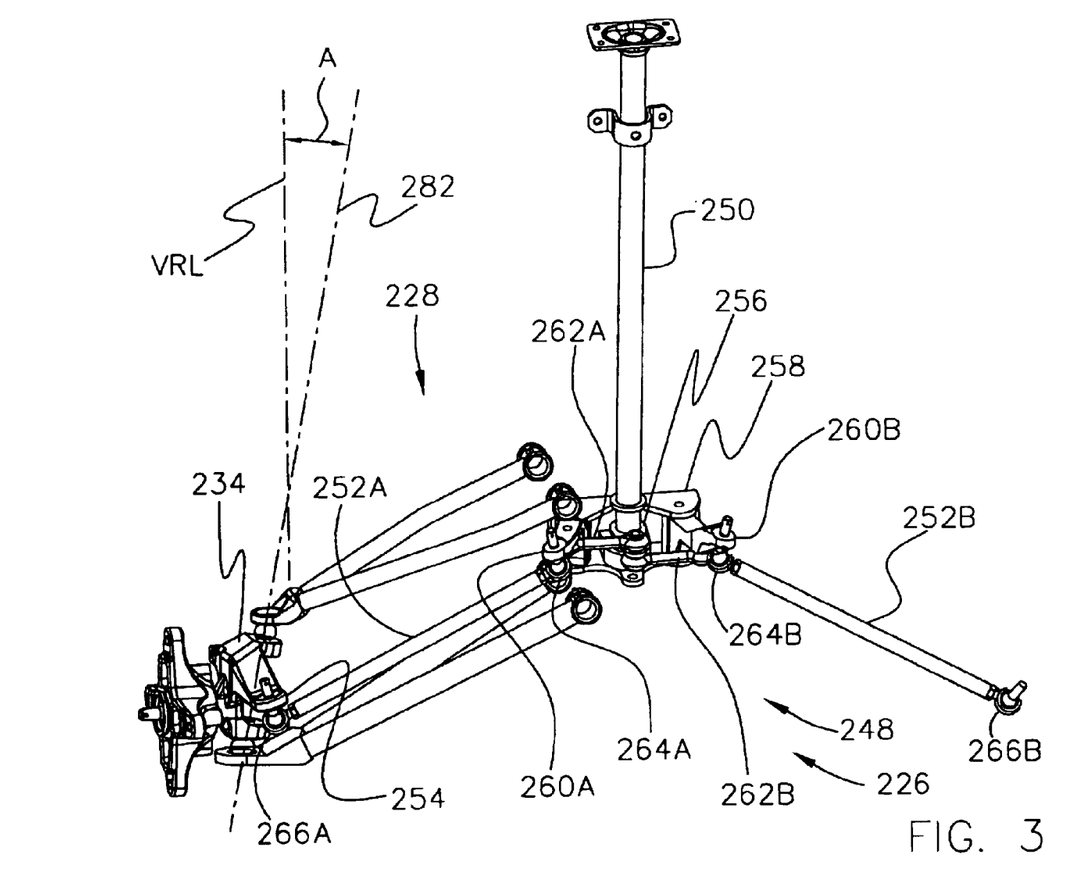
FIG. 3 is a perspective view of an assembly in accordance with the present invention.

FIG. 3 is a perspective view of an assembly 226 in accordance with the present invention. Assembly 226 comprises a steering system 248 including a steering column 250. In FIG. 3, it may be appreciated that a steering arm 256 is fixed to steering column 250 proximate a proximal end thereof. In some applications, a pair of handle bars may be fixed to steering column 250 proximate a distal end thereof.

In the embodiment of FIG. 3, the proximal end of steering column 250 is rotatably supported by a mounting bracket 258. Mounting bracket 258 also rotatably supports a left intermediate arm 260A and a right intermediate arm 260B. Left intermediate arm 260A is coupled to steering arm 256 by a left link 262A, and right intermediate arm 2603 is coupled to steering arm 256 by a right link 262B.

Steering system 248 also includes a left tie rod 252A and a right tie rod 252B. Left tie rod 252A includes an inner joint 264A and an outer joint 266A. In FIG. 3 it may be appreciated that left tie rod 252A is pivotally coupled to a protrusion 254 of a wheel carrier 234 at outer joint 266. In FIG. 3 it may also be appreciated that left tie rod 252A is pivotally coupled to left intermediate arm 260A at inner joint 264A.

Right tie rod 252B includes an inner joint 264B and an outer joint 266B. In FIG. 3 it may be appreciated that right tie rod 252B is pivotally coupled to right intermediate arm 260B at inner joint 264B. Right tie rod 252B is preferably also coupled to a right wheel carrier (not shown in FIG. 3) at outer joint 266B. Inner joints 264A, 264B and outerjoints 266A, 266B preferably provide three rotational degrees of freedom. In the embodiment of FIG. 2, inner joints 264A, 2641 and outer joints 266A, 266B comprise ball joints.

Steering system 248 may be used to rotate wheel carrier 234 about a steering axis 282. In the embodiment of FIG. 3, steering axis 282 is disposed at an angle A relative to a vertical reference line VRL. Vertical reference line VRL may be, for example, perpendicular to wheel contact plane 124 of FIG. 1. In a preferred embodiment, suspension 228 and steering system 248 are dimensioned so that movement of suspension 228 through its travel between a fill extension position and a full compression position is unlikely to cause rotation of wheel carrier 234 about steering axis 282. In a preferred embodiment, the inner joint of each tie rod is located so that rotation of wheel carrier 234 about steering axis 282 due to deflection of suspension 228 will be minimized.

An exemplary method for identifying a desired position for the inner joint 264A and inner joint 264B may include the following steps.

1. Identify the instant center axis when the suspension system is at full compression.
2. Identify the instant center axis when the suspension system is at fill extension.
3. Identify a first plane defined by the center of the outer tie rod ball and the instant center axis at full compression.
4. Identify a second plane defined by the center of the tie rod ball and the instant center axis at fill extension.
5. Identify a reference line formed by an intersection of the first plane and the second plane.
6. Identify a reference cylinder disposed about the reference line.
7. Select a desired position disposed within the reference cylinder.

Figure 4:
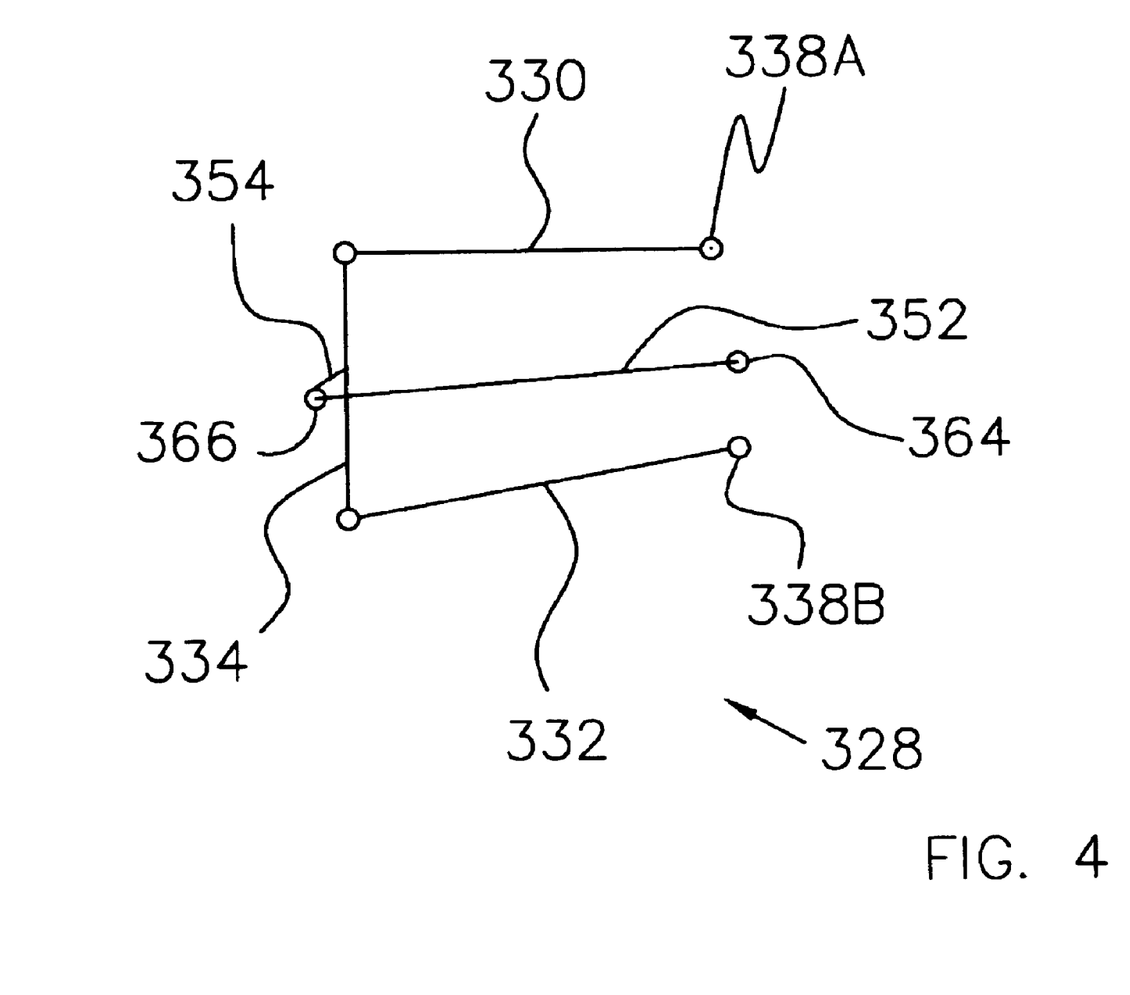
FIG. 4 is a diagrammatic view of a suspension in accordance with the an exemplary embodiment of the present invention.

FIG. 4 is a diagrammatic view of a suspension 328 in accordance with the an exemplary embodiment of the present invention. Suspension 328 comprises an upper arm 330 and a lower arm 332. In the embodiment of FIG. 2, upper arm 330 is rotatably coupled to an ATV frame at a first joint 338A. Also in the embodiment of FIG. 2, lower arm 332 is coupled to an ATV frame at a first joint 338B.

Suspension 328 also includes a wheel carrier 334 that is coupled to upper arm 330 and lower arm 332. In the exemplary embodiment of FIG. 4, an outer end of upper arm 330 is pivotably coupled to an upper portion of wheel carrier 334. Also in the exemplary embodiment of FIG. 2, an outer end of lower arm 332 is pivotally coupled to a lower portion of wheel carrier 334.

Suspension 328 also includes a tie rod 352 having an inner joint 364 and an outer joint 366. In FIG. 4 it may be appreciated that tie rod 352 is pivotally coupled to a protrusion 354 of wheel carrier 334 at outer joint 366. In the embodiment of FIG. 4 tie rod 352 is preferably pivotally coupled to an intermediate arm (not shown in FIG. 4) at inner joint 364. In a preferred embodiment, the location of inner joint 364 of tie rod 352 is selected to provide minimum bump steer.

Suspension 328 may assume various positions. For example, suspension 328 may have a fully extended position and a fully compressed position. In FIG. 4, suspension 328 is shown in a central position.

Figure 5:
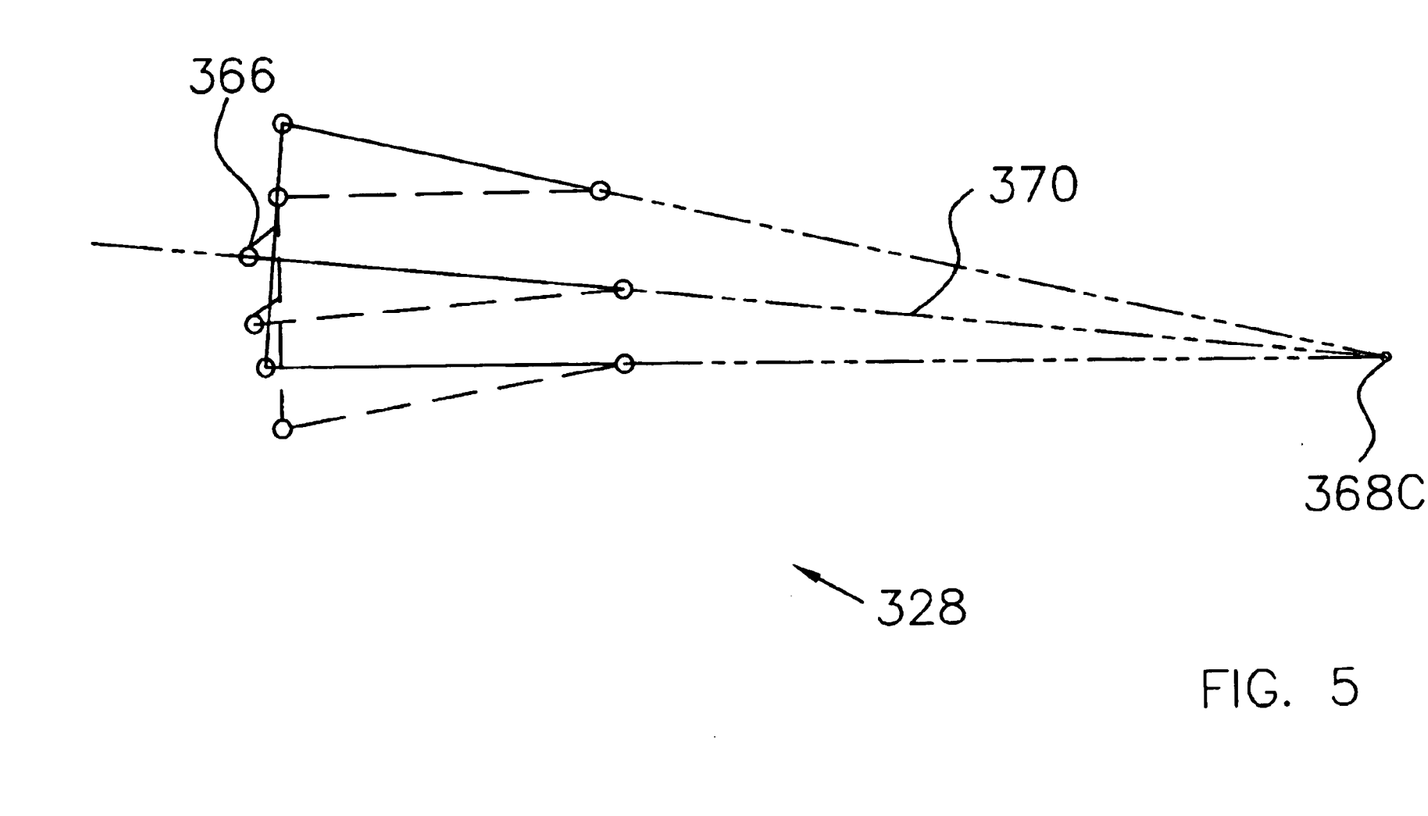
FIG. 5 is an additional diagrammatic view of the suspension of FIG. 4.

FIG. 5 is an additional diagrammatic view of suspension 328 of FIG. 4. In the embodiment of FIG. 5, suspension 328 is shown in a fully compressed position. The central position of suspension 328 is illustrated using dashed lines in FIG. 5. An first instant center axis 368C is shown in FIG. 5. A first reference plane 370 is also illustrated in FIG. 5. First reference plane 370 is defined by first instant center axis 368C and the center of outer joint 366.

Figure 6:
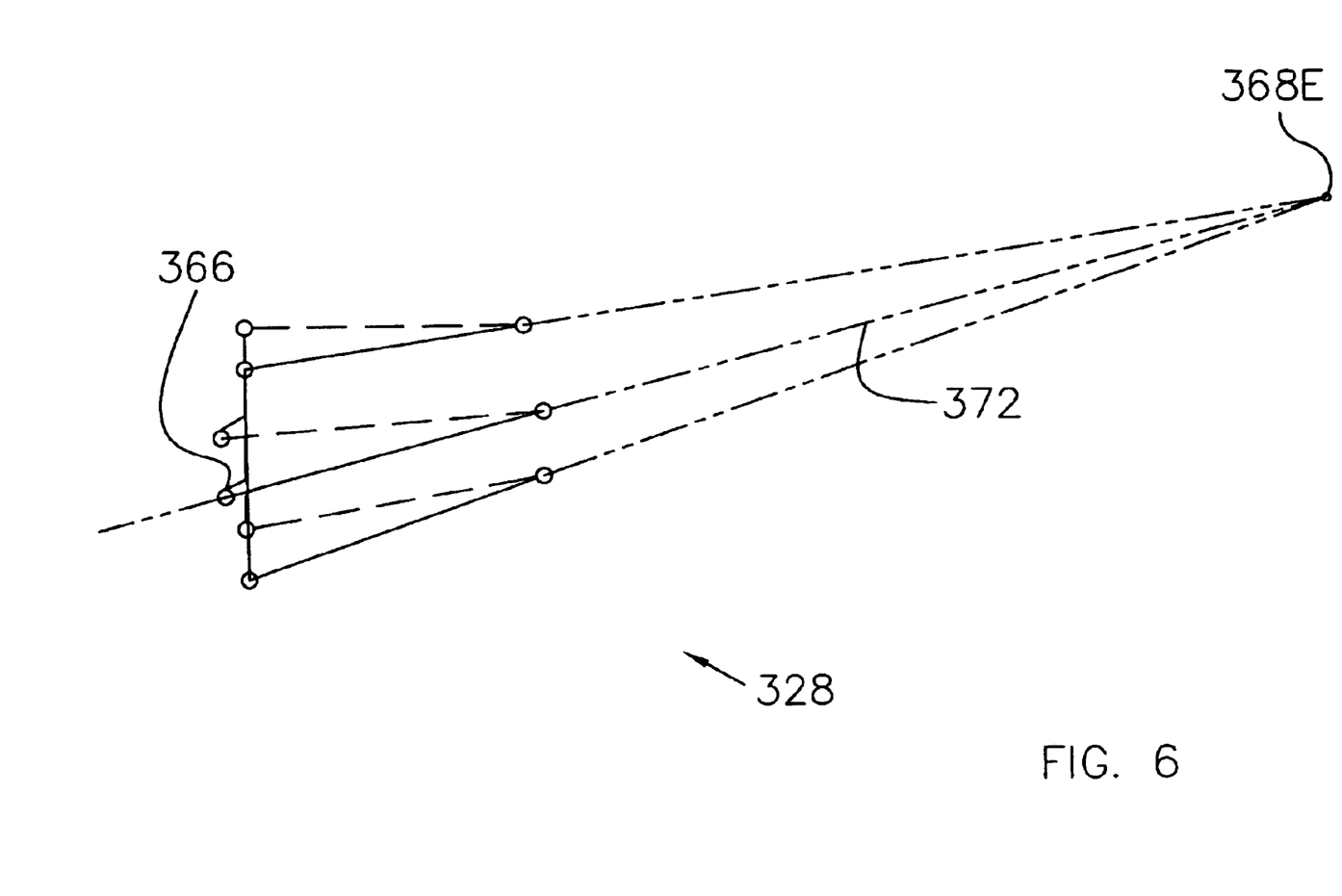
FIG. 6 is an additional diagrammatic view of the suspension of FIG. 4.

FIG. 6 is an additional diagrammatic view of suspension 328 of FIG. 4. In the embodiment of FIG. 6, suspension 328 is shown in a fully extended position. The central position of suspension 328 is illustrated using dashed lines in FIG. 6. An second instant center axis 368E is shown in FIG. 6. A second reference plane 372 is also illustrated in FIG. 6. Second reference plane 372 is defined by second instant center axis 368E and the center of outer joint 366.

Figure 7:
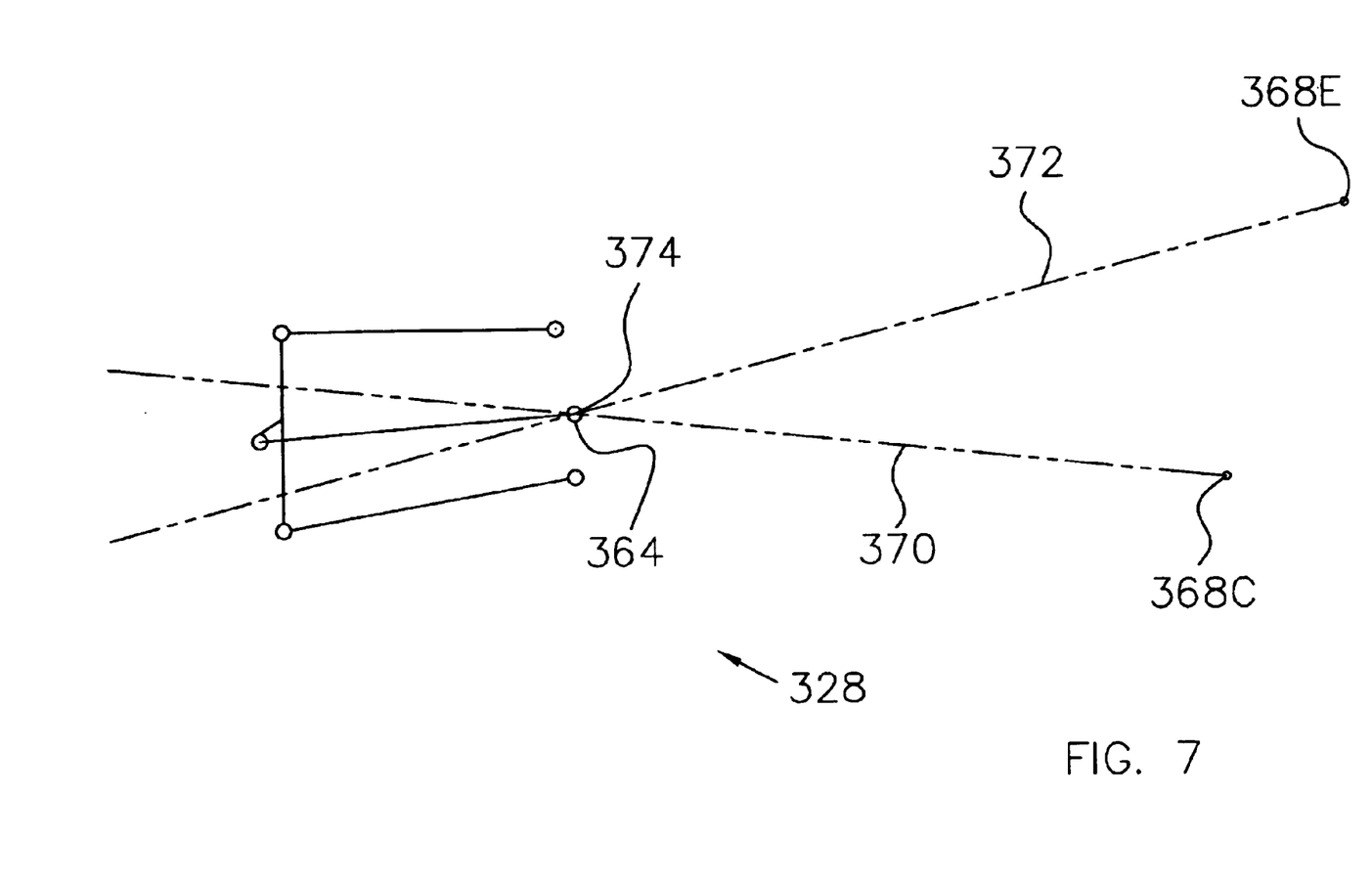
FIG. 7 is an additional diagrammatic view of the suspension of FIG. 4.

FIG. 7 is an additional diagrammatic view of suspension 328 of FIG. 4. First reference plane 370 and first instant center axis 368C at fall compression are shown in FIG. 7. Second reference plane 372 and second instant center axis 368E at full extension are also shown in FIG. 7. In FIG. 7 it may be appreciated that first reference plane 370 and second reference plane 372 intersect to define a reference line 374. In the embodiment of FIG. 7 the center of inner joint 364 is located along reference line 374.

It is to be appreciated that methods an apparatus in accordance with the present invention may be used with various types of suspension systems without deviating from the spirit and scope of the present invention. Examples of suspension systems that may be suitable in some applications include double A-arm suspensions, McPherson strut suspensions, and trailing arm suspensions.

Figure 8:
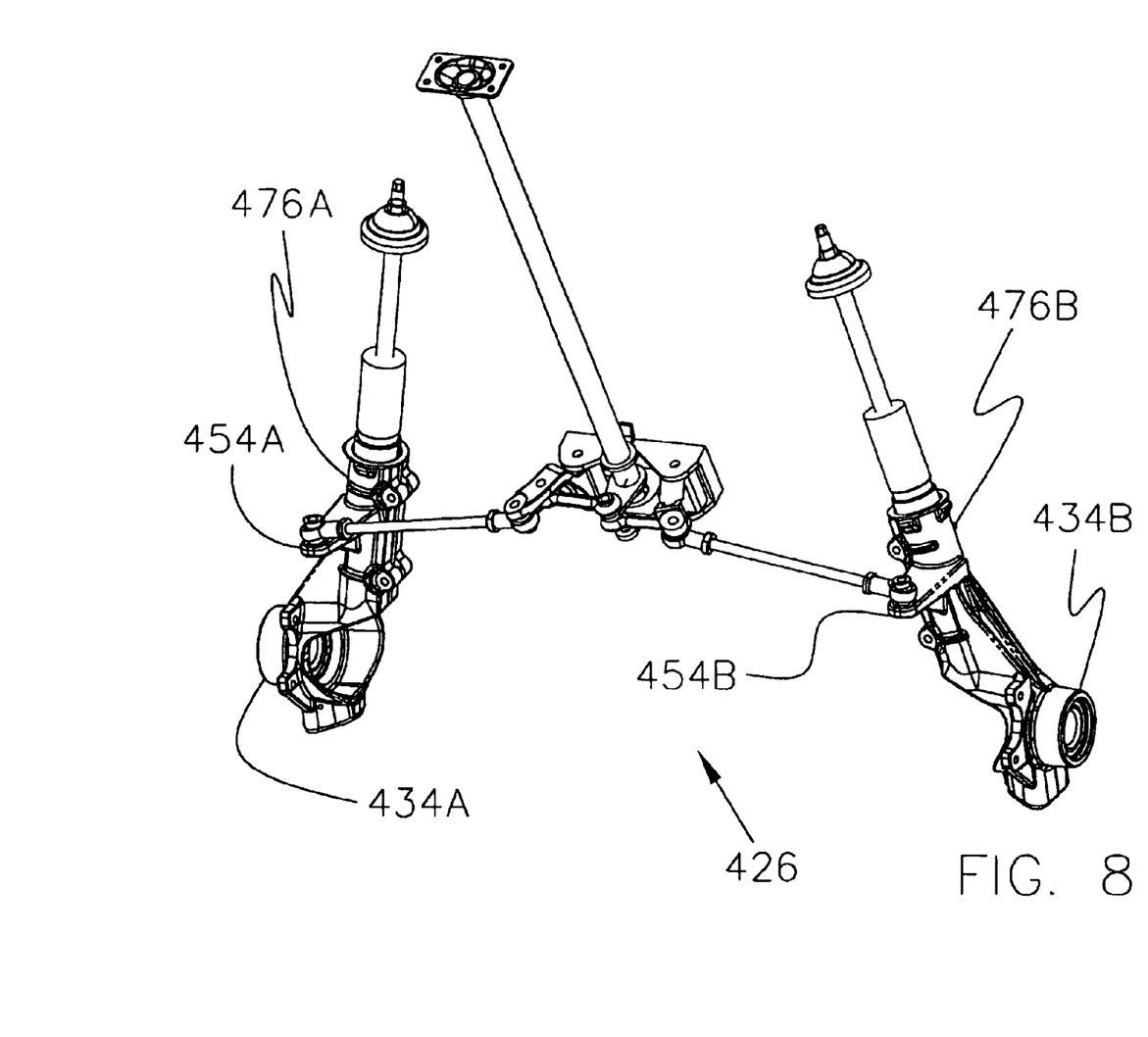
FIG. 8 is a perspective view of an assembly in accordance with an addition exemplary embodiment of the present invention.

FIG. 8 is a perspective view of an assembly 426 in accordance with an additional exemplary embodiment of the present invention. Assembly 426 includes a left strut 476A and a right strut 476B. Left strut 476A includes a wheel carrier 434A and a protrusion 454A. Right strut 476B includes a wheel carrier 434B and a protrusion 454B.

Figure 9:
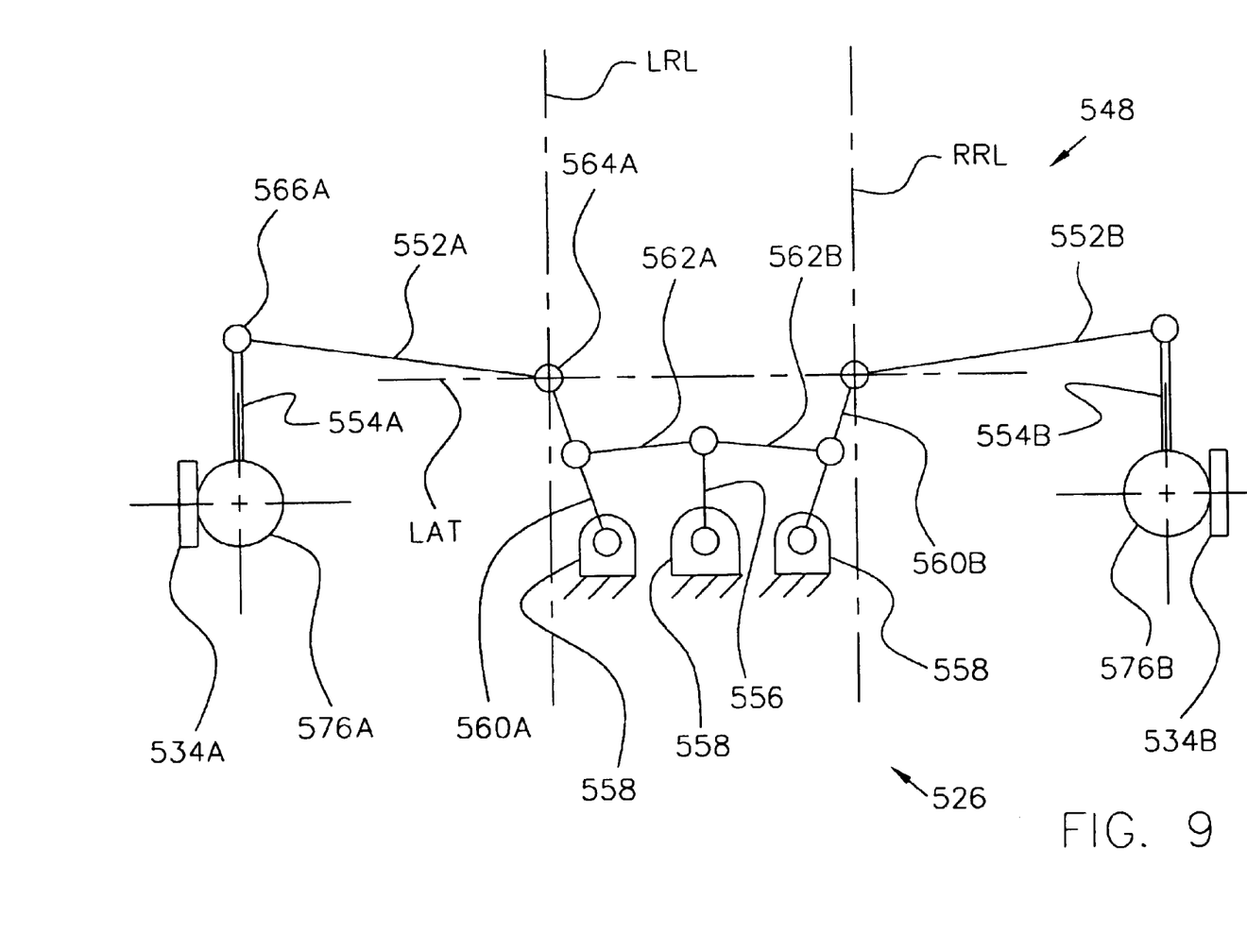
FIG. 9 is a diagrammatic top view of an assembly in accordance with an additional exemplary embodiment of the present invention.

FIG. 9 is a diagrammatic top view of an assembly 526 in accordance with an additional exemplary embodiment of the present invention. Assembly 526 includes a left strut 576A and a right strut 576B. Left strut 576A includes a wheel carrier 534A and a protrusion 554A Right strut 576B includes a wheel carrier 534B and a protrusion 554B.

Protrusion 554A and protrusion 554B form part of a steering system 548. Steering system 548 includes a steering arm 556. In the embodiment of FIG. 9, steering arm 556 is rotatably coupled to a bracket 558. A left intermediate arm 560A is rotatably coupled to an additional bracket 558. Additionally, a right intermediate arm 560B is rotatably coupled to a bracket 558. The brackets 558 are preferably fixed to a frame. Left intermediate arm 560A is coupled to steering arm 556 by a left link 562A, and right intermediate arm 560B is coupled to steering arm 556 by a right link 562B.

Steering system 548 also includes a left tie rod 552A and a right tie rod 552B. Left tie rod 552A includes an inner joint 564A and an outer joint 566A. Left tie rod 552A is coupled to protrusion 554A at outer joint 566A. A left reference line LRL is illustrated in FIG. 9. A desired location of left reference line LRL may be found using methods in accordance with the present invention.

In FIG. 9 it may be appreciated that the center of inner joint 564A is disposed along left reference line LRL. A lateral reference line LAT is also illustrated in FIG. 9. In the embodiment of FIG. 9, the center of inner joint 564A is disposed at the intersection of left reference line LRL and lateral reference line LAT. In an ATV in accordance with the present invention, lateral reference line LAT may extend, for example, laterally across a longitudinal axis of the ATV. Lateral reference line LAT may be, for example, generally perpendicular to the longitudinal axis of the ATV. A right reference line RRL is also illustrated in FIG. 9. A desired location of right reference line RRL may also be found using methods in accordance with the present invention.

Figure 10:
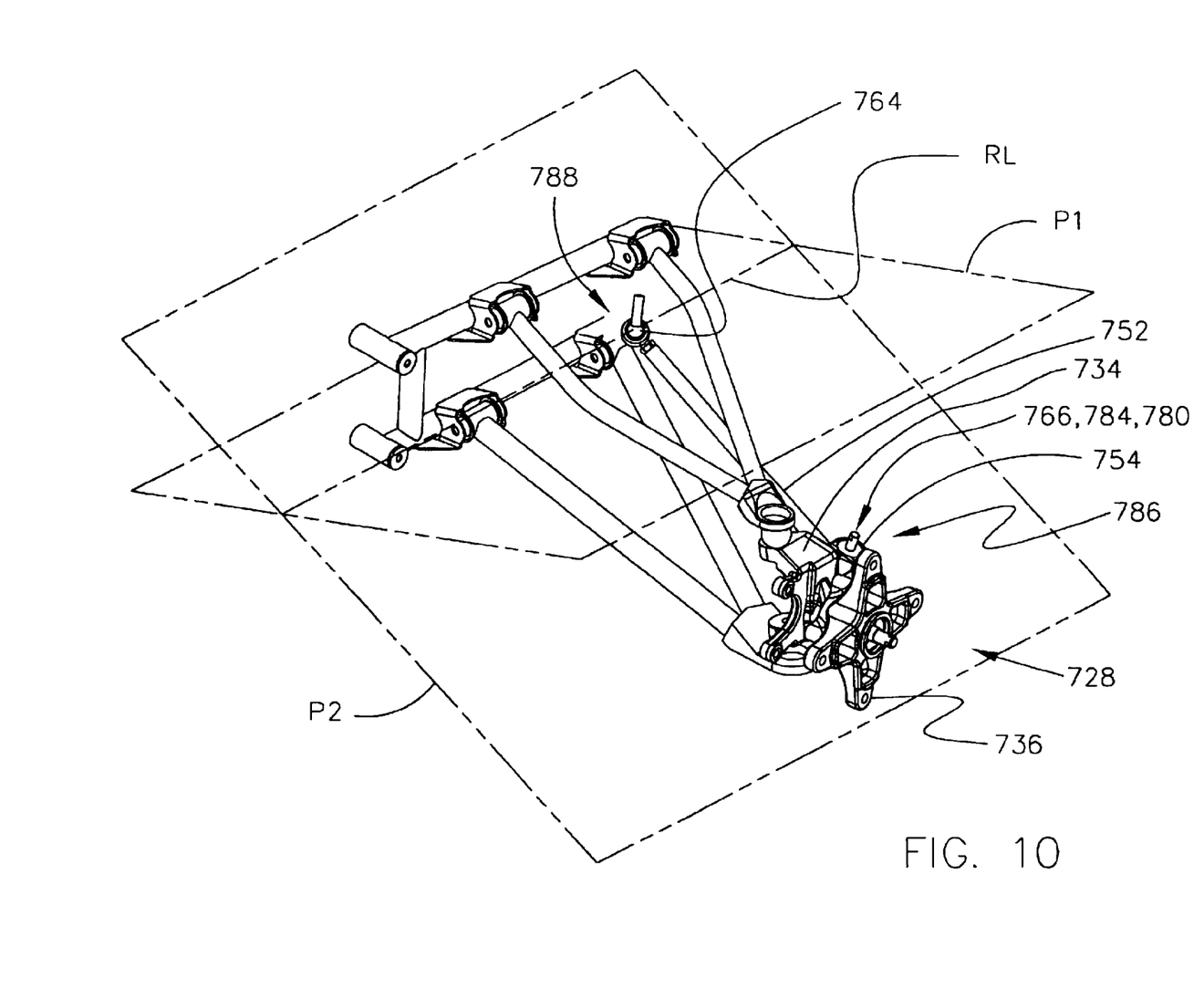
FIG. 10 is a perspective view of an assembly in accordance with yet another exemplary embodiment of the present invention.

FIG. 10 is a perspective view of an assembly in accordance with yet another exemplary embodiment of the present invention. The assembly of FIG. 10 comprises a suspension 728 including a wheel carrier 734 and a hub 736 rotatably supported by the wheel carrier. The assembly of FIG. 10 also includes a tie rod 752 having an inner joint 764 and an outer joint 766. In the embodiment of FIG. 10, outer joint 766 is coupled to a protrusion 754 of wheel carrier 734. In the embodiment of FIG. 10, outer joint 766 comprises a ball joint 780 having a pin 784. Pin 784 is visible in FIG. 10.

In FIG. 10 inner joint 764 is shown in a desirable position. In FIG. 1 it may be appreciated that a reference line RL intersects a center 788 of inner joint 764. Also referring to the embodiment of FIG. 10, reference line RL is defined by the intersection of a first reference plane P1 and a second reference plane P2. In some methods in accordance with the present invention, first reference plane P1 is defined by locating an instant center axis of suspension 728 when suspension 728 is at full compression and locating a central point 786 of outer joint 766 of tie rod 752 when suspension 728 is at the full compression position. In FIG. 10, suspension 728 is shown in a central position disposed between the full compression position and the fill extension position.

The second reference plane may be defined by locating an instant center axis of suspension 728 when suspension 728 is at full extension and locating central point 786 of the outer joint 766 of the tie rod 752 when suspension 728 is at full extension. Thus, the instant center axis and the central point of the outer joint define the second reference plane when suspension 728 is at full extension.

Figure 11:
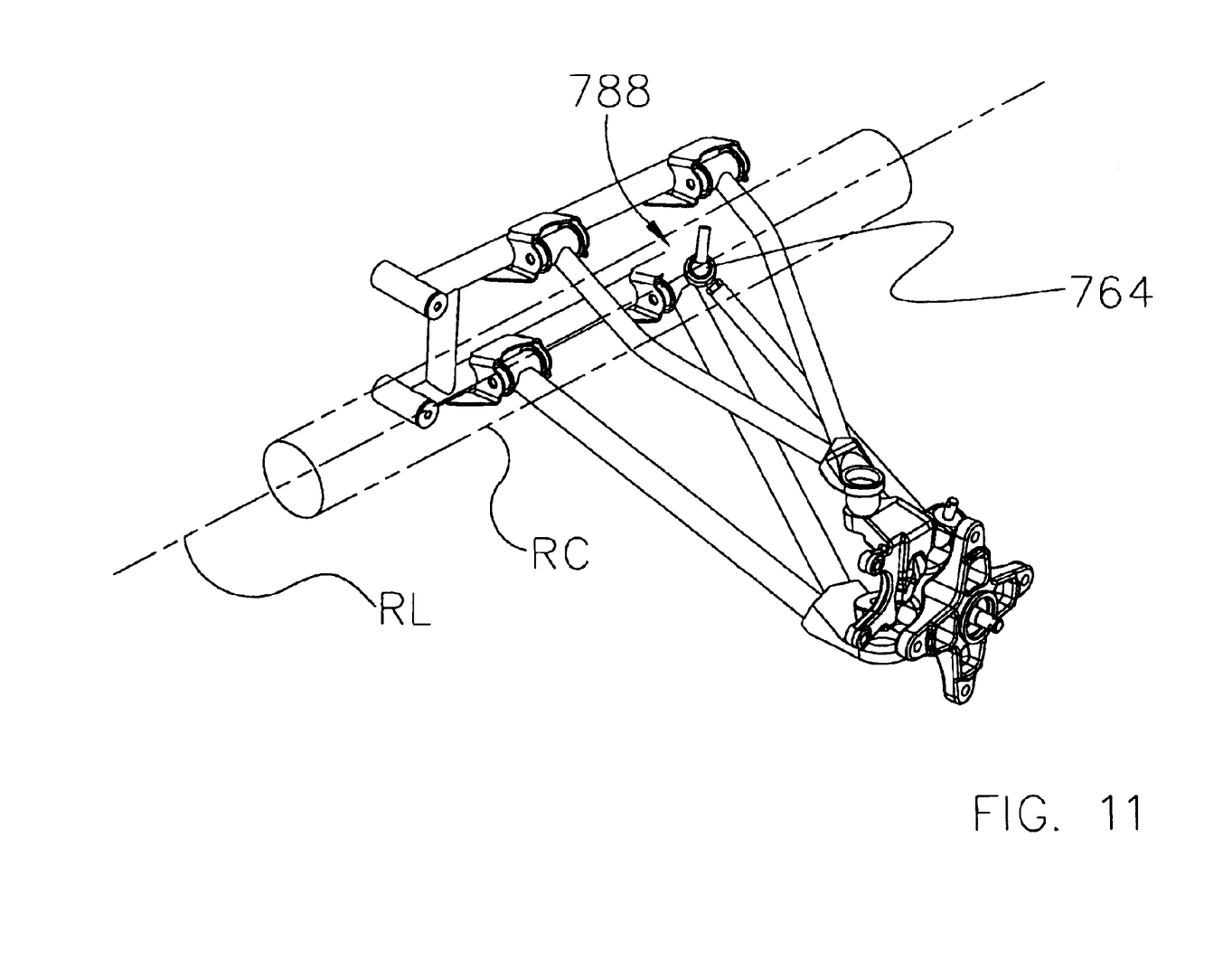
FIG. 11 is an additional perspective view of the assembly of FIG. 10.

FIG. 11 is an additional perspective view of the assembly of FIG. 10. In the embodiment of FIG. 11, a reference cylinder RC is centered about reference line RL. In the embodiment of FIG. 11, inner joint 764 is disposed within reference cylinder RC. In a useful embodiment, a center 788 of inner joint 764 is disposed within a reference cylinder having a radius of about 3.0 centimeters. In an advantageous embodiment, center 788 of inner joint 764 is disposed within a reference cylinder having a radius of about 2.0 centimeters. In a particularly advantageous embodiment, center 788 of inner joint 764 is disposed within a reference cylinder having a radius of about 1.0 centimeter.

Figure 12:
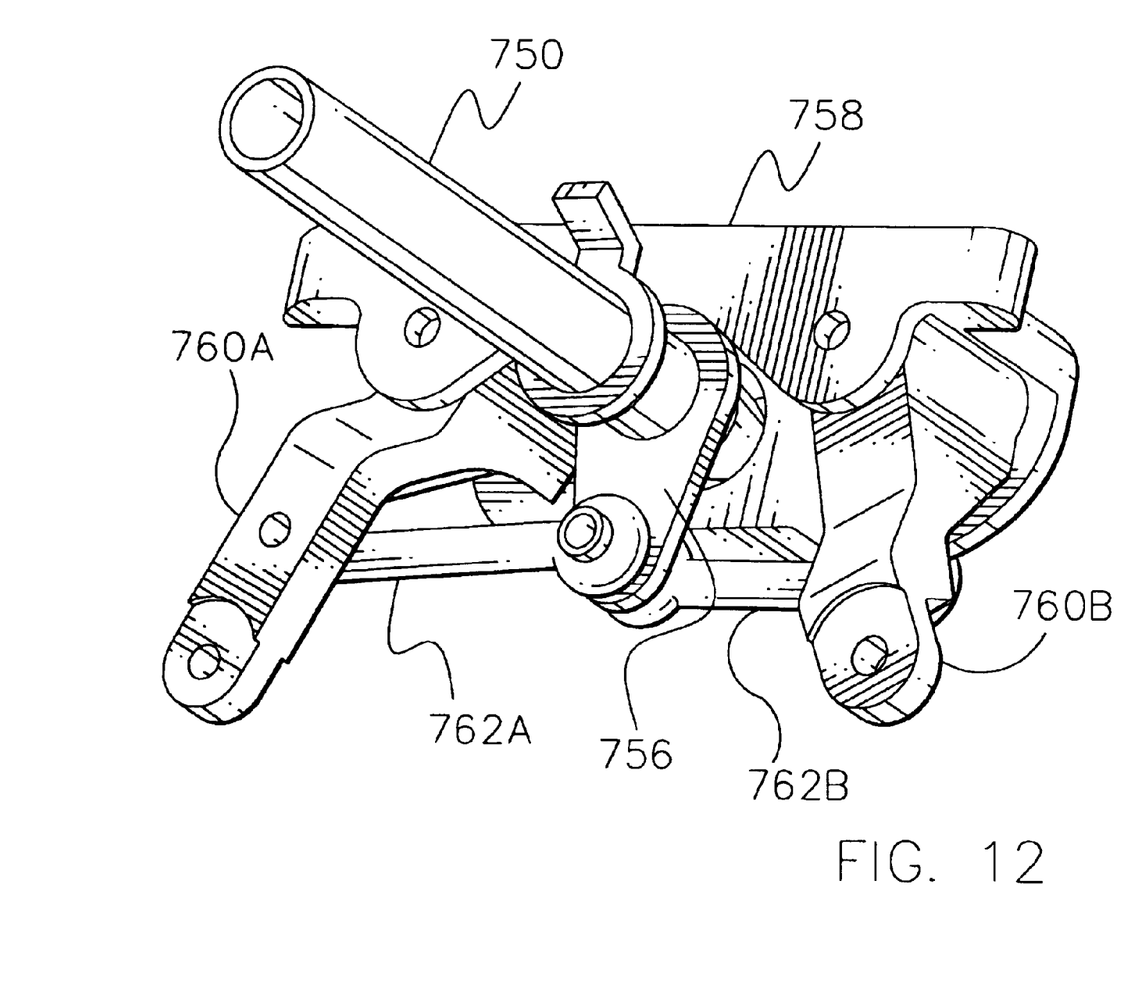
FIG. 12 is a perspective view of an assembly in accordance with an additional exemplary embodiment of the present invention.

FIG. 12 is a perspective view of an additional exemplary assembly in accordance with the present invention. The assembly of FIG. 12 includes a left intermediate arm 760A coupled to a steering arm 756 by a left link 762A. Steering arm 756 is coupled to a right intermediate arm 760B by a right link 762B. Right intermediate arm 760B and left intermediate 760A arm are rotatably coupled to a mounting bracket 758. A steering column 750 is rotatably supported by mounting bracket 758. In the embodiment of FIG. 12 steering arm 756 is fixed to steering column 750, for example, by welding. The assembly of FIG. 12 may form part of a steering system in accordance with the present invention.

Numerous characteristics and advantages of the invention covered by this document have been set forth in the foregoing description. For example, some embodiments of the present invention provide a suspension and steering system for an ATV that is dimensioned so that movement of the suspension through its travel between a fill extension position and a full compression position is unlikely to cause rotation of the wheel carrier about a steering axis. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A method of identifying a desirable location for an inner joint of a tie rod coupled to a wheel carrier of a suspension, the method comprising the steps of:

locating a full compression instant center axis of the suspension;

locating a full compression center point of an outer joint of the tie rod;

the full compression instant center axis and the full compression center point defining a first reference plane;

locating a full extension instant center axis of the suspension;

locating a full extension center point of the outer joint of the tie rod;

the full extension instant center axis and the full extension center point of the outer joint defining a second reference plane;

identifying a reference line formed by an intersection of the first reference plane and the second reference plane; and selecting a location proximate the reference line as the desirable location for the inner joint.

2. The method of claim 1, wherein the step of selecting a location proximate the reference line as the desirable location for the inner joint comprises the step of selecting a location at which the reference line will intersect the inner joint.

3. The method of claim 1, wherein the step of selecting a location proximate the reference line as the desirable location for the inner joint comprises the step of selecting a location at which the reference line will intersect a center of the inner joint.

4. A method of identifying a desirable location for an inner joint of a tie rod coupled to a wheel carrier of a suspension at an outer joint of the tie rod, the method comprising the steps of:

defining a first reference plane associated with a full compression position of the suspension;

defining a second reference plane associated with a full extension position of the suspension;

identifying a reference line formed by an intersection of the first reference plane and the second reference plane; and selecting a location proximate the reference line as the desirable location for the inner joint.

5. The method of claim 4, wherein the step of selecting a location proximate the reference line as the desirable location for the inner joint comprises the step of selecting a location at which the reference line will intersect the inner joint.

6. The method of claim 4, wherein the step of selecting a location proximate the reference line as the desirable location for the inner joint comprises the step of selecting a location at which the reference line will intersect a center of the inner joint.

7. The method of claim 4, wherein the step of defining the first reference plane comprises the steps of:

locating an instant center axis of the suspension when the suspension is at full compression;

locating a central point of the outer joint of the tie rod when the suspension is at full compression; and the instant center axis and the central point defining the first reference plane.

8. The method of claim 4, wherein the step of defining the second reference-plane comprises the steps of:

locating an instant center axis of the suspension when the suspension is at full extension;

locating a central point of the outer joint of the tie rod when the suspension is at full extension; and the instant center axis and the central point defining the second reference plane.

9. A vehicle comprising:

a frame;

a wheel carrier coupled to the frame by a suspension;

the suspension having a range of travel extending between a full extension position and a full compression position;

a tie rod coupled to the wheel carrier at an outer tie rod joint;

a center of the outer tie rod joint and a first instant center axis of the suspension defining a first reference plane when the suspension is in the full compression position;

the center of the outer tie rod joint and a second instant center axis of the suspension defining a second reference plane when the suspension is in the full extension position;

the first reference plane and the second reference plane intersecting to define a reference line; and an inner tie rod joint of the tie rod being disposed proximate the reference line.

10. The vehicle of claim 9, wherein the reference line intersects the inner tie rod joint.

11. The vehicle of claim 10, wherein the reference line intersects a center of the inner tie rod joint.

12. The vehicle of claim 9, wherein a center of the inner tie rod joint is disposed within a reference cylinder centered on the reference line.

13. The vehicle of claim 12, wherein the reference cylinder has a radius of less than about 3.0 centimeters.

14. The vehicle of claim 13, wherein the reference cylinder has a radius of less than about 2.0 centimeters.

15. The vehicle of claim 14, wherein the reference cylinder has a radius of less than about 1.0 centimeter.

16. The vehicle of claim 9, wherein a center of the inner tie rod joint is disposed proximate an intersection of the reference line and a second reference line.

17. The vehicle of claim 16, wherein the second reference line is perpendicular to a longitudinal axis of the vehicle.

18. The vehicle of claim 9, wherein the suspension comprises a McPherson strut suspension.

19. The vehicle of claim 9, wherein the suspension comprises a double A-arm suspension.

20. The vehicle of claim 9, wherein the tie rod is coupled to an intermediate arm at the inner rod joint; and the intermediate arm rotatably coupled to the frame of the vehicle.

21. The vehicle of claim 20, further including a steering arm rotatably coupled to the frame of the vehicle and an intermediate link extending between the steering arm and the intermediate arm.

* * * * *